United States Patent [19]

Chaurand et al.

[11] 3,789,111

[45] Jan. 29, 1974

[54] PROCESS OF MANUFACTURING ANHYDROUS CALCIUM SULFATE FORM II AND PRODUCTS OBTAINED BY THIS PROCESS

[75] Inventors: Patrice Chaurand, Ancone; Régis Magnan, Montelimar; Jean-Paul Coquery, Lyon, all of France

[73] Assignee: Progil and Ciments Lafarge, Paris, France

[22] Filed: Dec. 14, 1970

[21] Appl. No.: 97,947

[30] Foreign Application Priority Data

Jan. 6, 1970  France .............................. 70.00480

[52] U.S. Cl. ............................................... 423/555
[51] Int. Cl. ............................................ C01f 11/46
[58] Field of Search ........ 23/122; 106/109; 423/555

[56] References Cited
UNITED STATES PATENTS

| | | | |
|---|---|---|---|
| 1,463,913 | 8/1923 | Stuart et al. ........................ | 23/122 |
| 3,547,581 | 12/1970 | Gauster et al. ...................... | 23/122 |
| 2,113,370 | 4/1938 | Dunn et al. .......................... | 106/28 |
| 3,650,689 | 3/1972 | Cafferata ............................. | 23/122 |

FOREIGN PATENTS OR APPLICATIONS

| | | | |
|---|---|---|---|
| 1,274,488 | 8/1968 | Germany ............................. | 23/122 |

*Primary Examiner*—Oscar R. Vertiz
*Assistant Examiner*—Gregory A. Heller
*Attorney, Agent, or Firm*—Browdy & Neimark

[57] ABSTRACT

A process of making anhydrous calcium sulfate form II from synthetic gypsum by heating to a temperature of 325° – 450°C. in the presence of steam as catalyst for a period of time necessary to convert the gypsum into the anhydrous calcium sulfate II; the product may be ground and $K_2SO_4$ and/or sodium fluosilicate added.

8 Claims, 3 Drawing Figures

INVENTORS
PATRICE CHAURAND
REGIS MAGMAN &
JEAN-PAUL COQUERY

3,789,111

PROCESS OF MANUFACTURING ANHYDROUS CALCIUM SULFATE FORM II AND PRODUCTS OBTAINED BY THIS PROCESS

The present invention relates to a process of manufacturing anhydrous (form II) calcium sulfate called "overburnt," from synthetic gypsum, a by-product of phosphoric acid manufacture.

The invention further relates to the "overburnt substance" and building plaster obtained by using this process, as well as the "overburnt substance" usable for cement gypsing.

The man skilled in the art generally designates as "building plaster," the product constituted mainly of a mixture of semi-hydrated calcium sulfate and anhydrous calcium sulfate, form II or "overburnt substance." For example, in France, this name designates usually a mixture of two parts of semi-hydrated calcium sulfate to one part of the anhydrous one (French Standard 12-301).

Synthetic gypsum, a by-product of phosphoric acid manufacture, may be an especially interesting source for obtaining building plaster. The available quantities of this residual gypsum are such that for some years research has been conducted to find uses to permit its utilization either in building plasters, or as additives for cements. Though it does not contain, as its natural homolog, calcium carbonate (10 to 25 percent) it does include however, after washing, impurities made up of about 0.5 to 1 percent of fluorine and 1 percent of syn-crystallized $P_2O_5$.

Prior described processes have certain difficulties inherent to the included impurities, which made the obtained overburnt substance, wholly or partly useless for precise and limited conditions. Thus, it has been determined that plasters containing it have delayed setting times, insufficient resistances or also some sensitiveness to the mixing water, a behavior irregular with regard to classical plaster additives, such as retarding or thickening agents. Moreover, the hydration of overburnt substances in such plasters is slow and incomplete.

Other attempts have been made, but which led essentially to the obtaining of semi-hydrate and even of soluble anhydrite (anhydrous sulfate III). Among the most interesting, is the process described in the British Patent No. 1,051,849 dated Dec. 3, 1963, consisting of introducing in a continuous way, an aqueous slurry of synthetic gypsum into a reactor, under a pressure greater than atmospheric, of maintaining the slurry at a temperature greater than 100°C. by injecting steam under high pressure, then of extracting in a continuous way a slurry of semi-hydrated calcium sulfate without reducing pressure. This process is not quite satisfactory since it leads only to the semi-hydrate.

Another process is described in the French patent 1,288,836 dated Feb. 14, 1961 and relates to the burning of a natural gypsum, in granular or pulverulent state. The burning enclosure which presents itself as a passage, is divided into several zones, each of them being provided with heating elements crossed by heat-transfer fluids ensuring burning temperatures ranging between 110°C. and 180°C. according to the zones. Gypsum is introduced into one of the enclosure ends in which end it is brought to a temperature near that at which dehydration begins. Then, fluidized by cyclic or continuous injections of steam or of a mixture of vapor and air, or of air alone under pressures from 0.5 kg/cm² to 15 kg/cm² according to zones, the gypsum progresses from one end to the other of the burning passage. In the central part of the enclosure it is heated at 130°–135°C. and transformed partly into the semi-hydrate. Upon reaching the other end it is brought to the temperature of 160° – 180°C. allowing the removing of last traces of non-burnt gypsum and the transformation of a part of the semi-hydrate into soluble anhydrite. This process does not give an adequate solution since it leads to a mixture of semi-hydrate and soluble anhydrite.

It is because of the major precited disadvantages and especially of the practically complete impossibility to obtain a stable anhydrite (anhydrous form II) or "overburnt substance" of convenient quality that work has been conducted to find original ways allowing the obtaining of the overburnt substances usable in building plasters and in cement gypsing. Thus, a process of manufacturing form II anhydrous and semi-hydrated calcium sulfates from synthetic gypsum, has been developed and described in U. S. patent application Ser. No. 831,300 filed June 9, 1969 now abandoned.

This process gives very good yields of a range of products having excellent characteristics.

Applicants have now developed a new process of manufacturing an "overburnt substance" for building plaster and cement gypsing, which gives products with excellent yields having properties which are identical or better than those of their homologs obtained from natural gypsum.

In its most general form, the process according to the present invention consists essentially of treating washed synthetic gypsum in a rotative oven with indirect heating to bring it progressively to a temperature greater than 250°C., then of cooking it while maintaining it at said temperature in the presence of steam for such a time that transformation into form II anhydrous sulfate is complete.

Treatment temperature is very important in the transformation of synthetic gypsum into stable anhydrite (overburnt). The results of numerous cooking tests are shown in the drawings in which.

Figure 1:
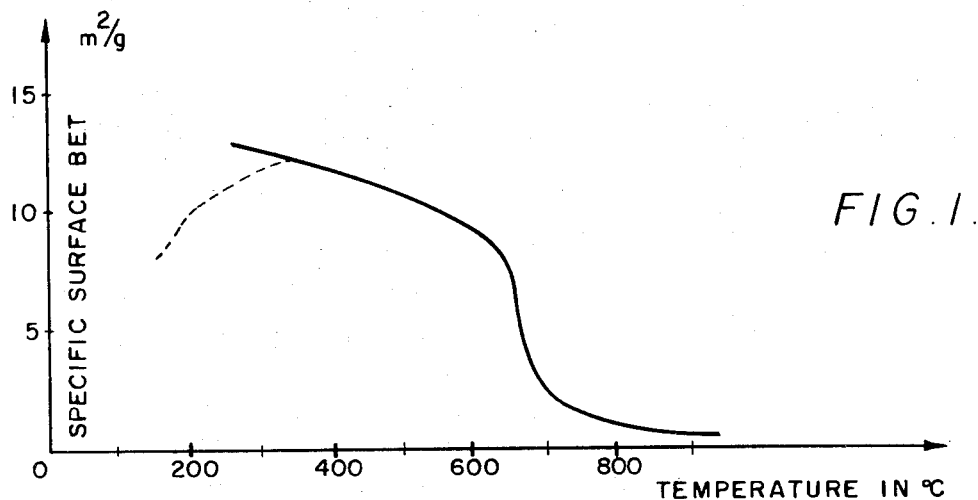
FIG. 1 is a graph showing the specific surface BET plotted against temperature in °C. wherein the dotted line shows the field of soluble anhydrite by treatment without steam and the full line shows the field of stable anhydrite by steam treatment.

The BET specific surface is that measured according to the technique for adsorption of nitrogen perfected by the scientists Baunauer, Elmett and Teller. As shown on the curves of FIG. 1, the BET specific surface of anhydrite is plotted against cooking temperature for times of 2 to 5 hours. It is noted in this case that the specific surface is optimal in the range of 250° – 400°C. Below 300°C. the transformation speed into anhydrite II is very slow and thus it is seen that gysum cooking into overburnt substance at such low temperatures is practically impossible from an industrial point of view.

Figure 2:
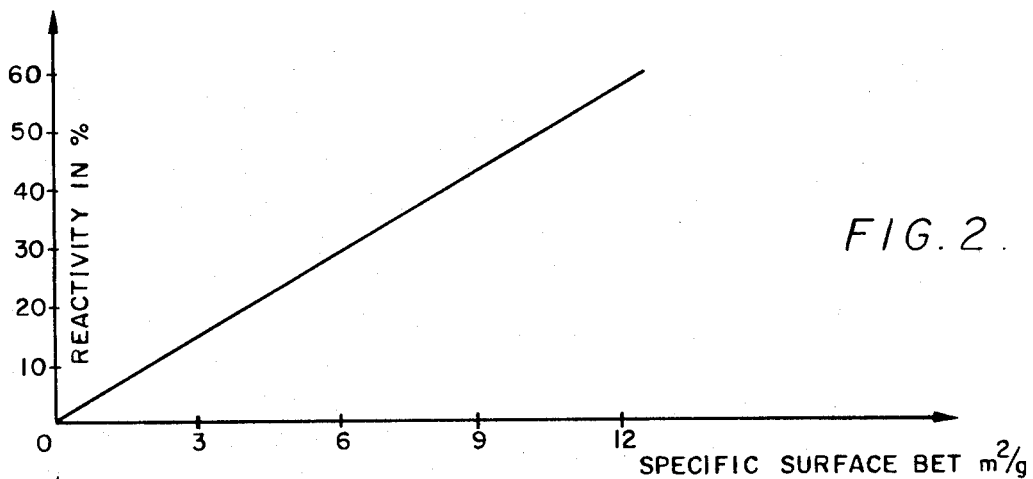
FIG. 2 shows the reactivity of the overburnt substance plotted against specific surface BET.

Further, it was noted that the reactivity of the overburned substance, defined by its hydration rate after 3 days in a building plaster was proportional to BET specific surface as shown in the curve of FIG. 2. It has been verified that the products obtained by cooking at 350°C. and 400°C. are little different, their BET specific surface being about 12 m²/g. The preferential temperature of treatment was thus determined to be between 325°C. and 450°C.

The presence of steam in the oven is essential to ensure quickly the transformation of gypsum into stable anhydrite (or anhydrous sulfate II) at temperatures equal to or lower than 450°C. Not interfering as a heat transfer fluid, it plays the very important part of cooking catalyst. It may be introduced in a continuous manner, into the cooking oven under a pressure between 1 and 5 bars above atmospheric pressure.

Figure 3:
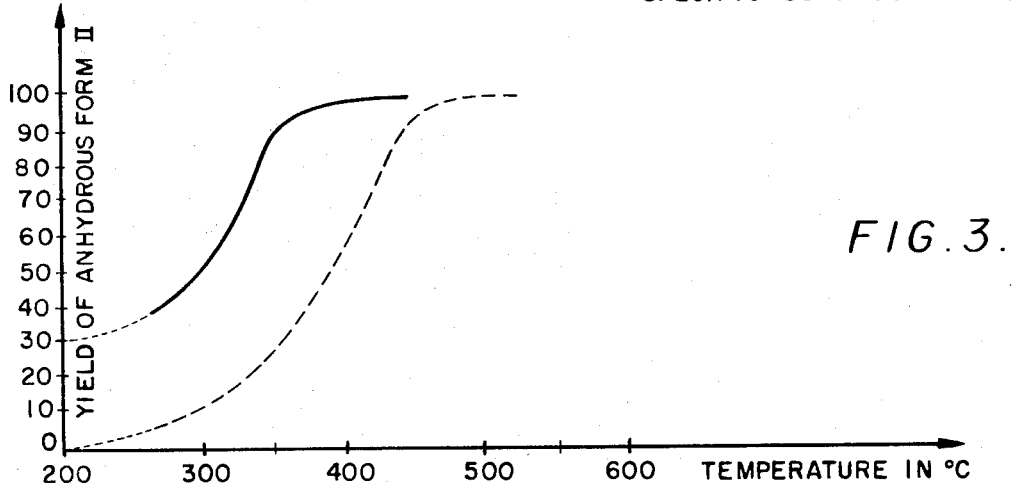
FIG. 3 shows the yields of anhydrous sulfate II plotted against temperature wherein the dotted line represents the yield in the absence of steam and the fully line represents the yield in the presence of steam.

According to a variant the steam may be formed in situ by a very fine pulverisation of water, passing quickly to the gaseous state at the gypsum cooking temperature. According to another variant, the oven may be maintained under a slight vacuum and, in this case steam pressure may fall to 0.7 bars. Thus, the reactivity characteristic of the overburnt substance obtained by cooking at low temperature in an indirect heating oven in the presence of steam, is quite improved with regard to that of the overburnt substance obtained by cooking in classical ovens running at higher temperatures, without vapor injection or water pulverisation. It has been determined that the yield of overburnt substance obtained by cooking at 350°C. without steam injection was very poor, while the yields of overburnt substance obtained at the same temperature and in the same oven, with steam injection, were very interesting from an industrial point of view as shown by the curves of FIG. 3, which represents the yields of transformation into anhydrous sulfate II with regard to temperature, with and without steam, for a cooking time of 45 minutes.

According to the temperature and steam pressure, cooking time necessary for gypsum transformation into stable anhydrite may vary between large limits ranging from 5 minutes to 120 minutes.

Thus, under a steam pressure of 1 atmosphere, cooking lasts:
  at 350°C : 90 minutes with a yield of about 96 percent in overburnt substance (anhydrous II)
  at 400°C : 10 minutes with a yield of about 98 percent in overburnt substance (anhydrous II)
cooking time being measured when cooking temperature is reached.

The grinding of the overburnt substance obtained according to the process of the invention has a quite favorable effect on the overburnt substance reactivity; so, it is advantageous to grind or triturate the substance after cooking.

Moreover, it has been noted that the addition of 0.2 to 1 percent of $K_2SO_4$ with regard to the weight of overburnt substance improved the reactivity perceptibly. This reactivity may still further be increased when an equal quantity of sodium fluosilicate is added to the overburnt substance in place of $K_2SO_4$ or in combination with it. The addition of $K_2SO_4$ fluosilicate may be made either before, or after cooking, or even after grinding. Thus it has been noted that the reactivity of a ground overburnt substance, obtained by cooking at 350°C. with steam injection, passed from 65 percent without addition to 80 percent when introducing 0.5% of $K_2SO_4$ (with regard to the weight of overburnt substance).

Those excellent results come from the combination of two especially favorable actions, the first one ensured by cooking at low temperature in the presence of steam which acts directly as a catalyst, the other one, by $K_2SO_4$ and/or fluosilicate which, activating overburnt substance hydration, permits obtaining a plaster having an industrial value.

In the building plaster finally obtained, the overburnt substance has a hydration rate of 80 percent lower than for a natural gypsum plaster, but, given the purity of synthetic gypsum, the active hydraulic part is the same and resistances are similar (but after 7 days hydration is complete). In order to increase the range of use of the products according to this invention it is also possible to introduce accelerating additives, classical thickening or retarding agents such as cellulosic products, as carboxymethylcellulose, or constituted of solubilized proteins, etc.

The process according to this invention may be used in a discontinuous rotative oven with an external heating and of known type in horizontal position, provided with internal raising devices and with a water pulverisation or vapor axial admission. It may also be used in a continuous way in an oven of known type provided with fumes tubes. The vapor injection or water pulverisation system may, be, in this last case, suppressed as steam may be formed in situ, due to the water brought by the wet gypsum drying, then by its dehydration down to the state of anhydrous sulfate III, the transformation of this into anhydrite II being made in a catalytic way due to the steam.

The following examples show how the invention may be practically used:

EXAMPLE 1 — BUILDING PLASTER

A series of reactivity measurements have been made for various types of overburnt substances obtained by cooking synthetic gypsum, either to 600°C. according to the known previous processes or to 350°C. according to this process, for classes of ground or unground products, with or without the introduction of additives. Then, building plasters have been prepared by mixing 50 percent of semi-hydrated calcium sulfate, obtained from the same synthetic gypsum, with 50 percent of overburnt substance according to this invention. Those plasters have been mixed with demineralized water in a ratio water/plaster (w/p) equal to 1. Then these plasters have been submitted to tests of so-called use and setting times. The results obtained are given in the table 1 hereinafter. The use beginning and end as well as the end of the setting were measured according to French standard NF B.12 402, whereas the beginning of setting has been calculated according to French standard NF B-12 401.

The formulation obtained by cooking at 350°C., grinding and adding 0.25 percent of $K_2SO_4$ and 0.05 percent of thickening agent, has been used to complete tests on a working place (use limits : 10 minutes). The plaster resistances, measured on standardized samples (w/p : 0.8) were as follows:
  for 2 hours — 9 bars
  for 24 hours — 11 bars
  for 7 days — 17 bars
  for 7 days, and dried 28 bars

TABLE 1

| | 600°C. without steam | | 350°C. with steam | | | |
|---|---|---|---|---|---|---|
| Type of overburnt substance-treatment at: | without grinding | with grinding | without grinding | with grinding | with grinding and 0.25% of $K_2SO_4$ | with grinding and 0.25% of $K_2SO_4$ + 0.05% of a thickening agent |
| Reactivity of overburnt substance in % | 35 | 40 | 60 | 65 | 80 | 80 |
| Plaster consistence (W/p=1) use beginning (in min.) | 8.5 | 11 | 3 | 17 | 12.5 | 7 |
| setting beginning (in min.) | 10 | 12.75 | 4 | 22 | 15.5 | 12.5 |
| use end (in min.) | 12.5 | 15 | 5 | 24.5 | 19 | 17 |
| setting end (in min.) | greater than 600 | 40 | 15 | 50 | 40 | 38 |

The hardness of coatings achieved from this plaster (w/p = 1) was 65 ± 5° Shore, scale C.

Plaster was very fine:

2 percent of oversize for a 0.2 mm mesh sieve (French standard NF X 11-501)

20 percent of oversize for a 0.1 mm mesh sieve (French standard NF X 11-501)

The excellent characteristics of this plaster allow it to be classified in the classes PFC.2 of the French standard NF B. 12-301 established for building plasters from natural origin.

EXAMPLE 2

Plaster of strong hardness having a slow setting.

An overburnt substance has been prepared according to the process of the invention (steam pressure : 1.5 bars; temperature : 350°C.), then 0.7 percent of $K_2SO_4$ have been incorporated in it. After grinding, the product has been mixed with 41 percent of its weight in water. It had the following characteristics:

setting beginning : 20 minutes
setting end : 1 h. 45 minutes
Flexion resistances:

for 2 days, 25 kg/cm²
for 7 days, 60 kg/cm²
for 7 days, and drying to a constant weight : 132 kg/cm²

Compression resistances (NF B-12401):
for 2 days, 60 kg/cm²
for 7 days, 170 kg/cm²
for 7 days, and drying to a constant weight, 400 kg/cm²

Coating hardness was greater than 95° Shore, Scale C

The process of manufacture according to the invention, of form II anhydrous sulfate called "overburnt substance," from synthetic gypsum which is a by-product of phosphoric acid fabrication, allows obtaining products having an easy and economical industrial utilization, usable either such as they are, or as an ingredient in plasters the same as in cements in which they play the part of the gypsing agent. The proportions of overburnt agent incorporated in plasters and cements depend of course upon the characteristics desired for the contemplated applications of the final products. It is possible to tell, that in a general way, they may vary between 5 percent and 70 percent of the weight of the dry products mixture, in case of plaster, and between 0.5 percent and 10 percent in the case of cement.

It will be obvious to those skilled in the art that various changes may be made without departing from the scope of the invention and the invention is not to be considered limited to what is described in the specification.

What is claimed is:

1. A process of manufacturing anhydrons calcium sulfate II from synthetc gypsum which comprises heating washed gypsum in an indirect heating oven from ambient temperature to a temperature greater than 325°C., and cooking said heated gypsum at a temperature in the range of from 325° – 450°C. in the presence of steam, used as a catalyst, for a period of between 5 – 120 minutes so that the transformation into anhydrous calcium sulfate II is complete.

2. A process according to claim 1 wherein the steam pressure is between 0.7 and 6 bars.

3. A process according to claim 1 wherein the steam is injected continuously into said oven.

4. A process according to claim 1 wherein the steam is formed in said oven by water pulverisation.

5. A process according to claim 1 wherein the steam is formed in situ from gypsum dehydration water.

6. A process according to claim 1 wherein the anhydrous calcium sulfate II obtained is submitted afterwards to a grinding operation.

7. A process according to claim 1 wherein 0.2 to 1 percent by weight of $K_2SO_4$ is added.

8. A process according to claim 7 wherein at least a portion of said $K_2SO_4$ is replaced by sodium fluosilicate.

* * * * *